Figure 1:
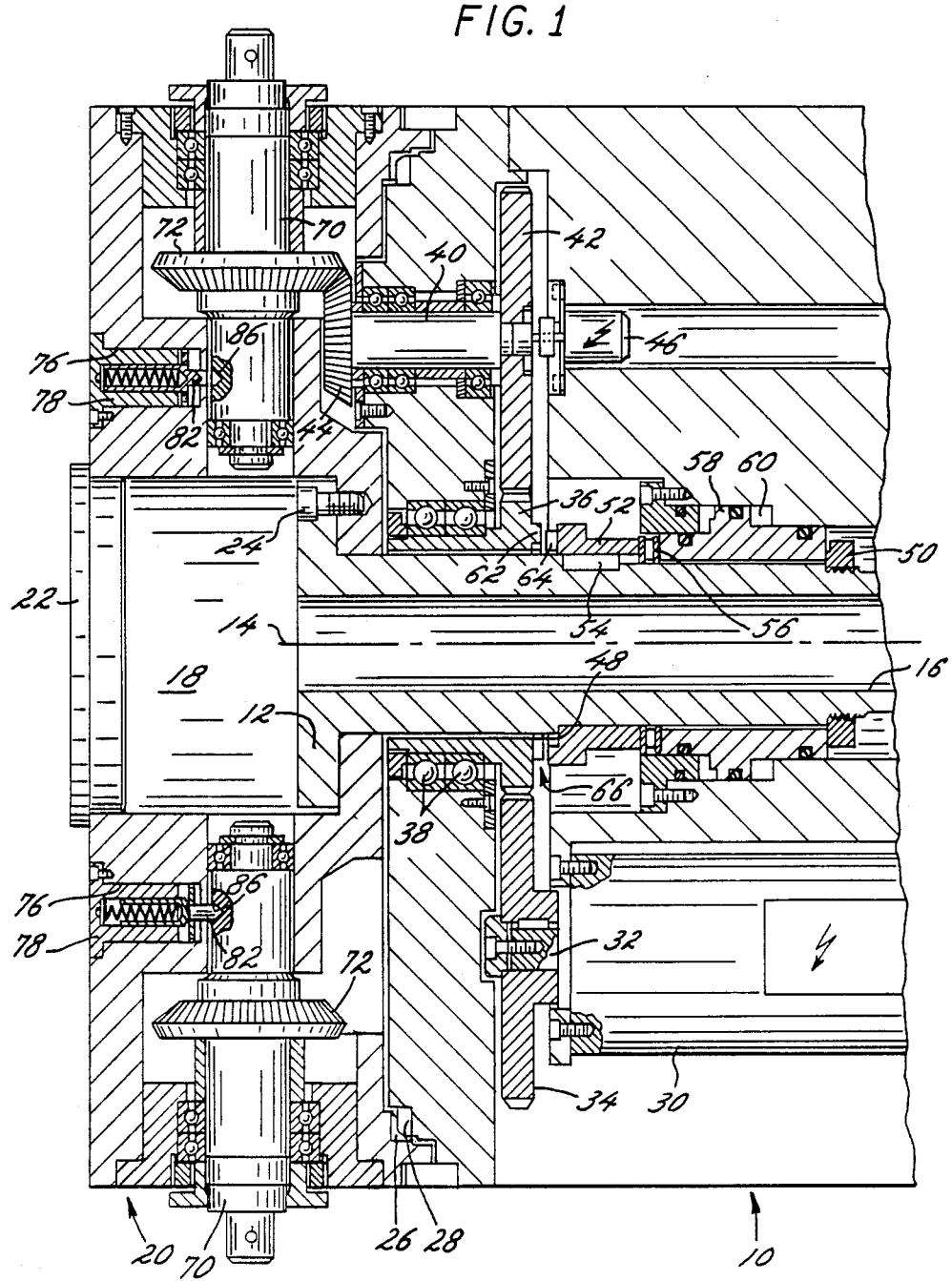

United States Patent [19]

Schleich

[11] Patent Number: 4,872,244
[45] Date of Patent: Oct. 10, 1989

[54] TURRET WITH SEVERAL DRIVABLE TOOL SPINDLES FOR A MACHINE TOOL

[75] Inventor: Günther Schleich, Hochdorf, Fed. Rep. of Germany

[73] Assignee: Index-Werke Comm.-Ges. Hahn & Tessky, Esslingen, Fed. Rep. of Germany

[21] Appl. No.: 238,310

[22] Filed: Aug. 30, 1988

[30] Foreign Application Priority Data

Sep. 11, 1987 [DE] Fed. Rep. of Germany ....... 3730561

[51] Int. Cl.⁴ ............................................ B23B 29/32
[52] U.S. Cl. .......................................... 29/40; 409/231
[58] Field of Search ...................... 29/40, 39, 36, 27 R, 29/26 R, 26 A, 27 C, 53, 55, 568; 409/215, 231, 232; 82/2.7; 74/820, 813 L, 396, 425

[56] References Cited

U.S. PATENT DOCUMENTS

| 3,083,617 | 4/1963 | Swanson et al. | 409/215 X |
| 3,845,532 | 11/1974 | Smith | 29/40 |
| 4,563,925 | 1/1986 | Link | 82/27 X |
| 4,715,102 | 12/1987 | Wolf et al. | 29/27 R |

FOREIGN PATENT DOCUMENTS

| 2044187 | 3/1972 | Fed. Rep. of Germany | 29/40 |
| 2928912 | 1/1981 | Fed. Rep. of Germany | 29/40 |
| 3630966 | 3/1987 | Fed. Rep. of Germany | 29/40 |
| 494122 | 8/1919 | France | 29/40 |
| 48227 | 3/1985 | Japan | 29/40 |
| 1079364 | 3/1984 | U.S.S.R. | 29/36 |
| 1168342 | 7/1985 | U.S.S.R. | 29/40 |
| 2126134 | 3/1984 | United Kingdom | 29/40 |

Primary Examiner—William Briggs
Attorney, Agent, or Firm—Leydig, Voit & Mayer

[57] ABSTRACT

Turret comprising a turret body and a turret head which is rotatable about an indexing axis relative to the turret body and in which several spindles are rotatably mounted. By moving away from the turret body in the direction of the indexing axis, the turret head is unlocked and made rotatable about the indexing axis. To enable one only or several selected spindles to be driven at a time and the remaining spindles to be locked against unintentional rotation, a drive shaft mounted in the turret body in spaced relation to the central indexing axis is released from the previously driven spindle when the turret head moves away from the turret body, and, in addition, each spindle has an associated locking mechanism which is arranged in the turret head and which is only released in the case of the spindle to be driven at that particular time when the turret head is locked on the turret body.

15 Claims, 3 Drawing Sheets

TURRET WITH SEVERAL DRIVABLE TOOL SPINDLES FOR A MACHINE TOOL

The invention relates to a turret for a machine tool comprising several drivable tool spindles, the tools of which are fully automatically changeable.

The shapes required on workpieces produced on machine tools, in particular, lathes, are becoming increasingly complex. Therefore, in general, a turret must be able to be equipped with several driven tools. These should also be fully automatically changeable so as to enable fully automatic production. A precondition of automatic tool change is a particular rotary angular position of the respective tool spindle for the tool change, for example, in order to enable a clamping bolt on the tool spindle to be actuated by a powered screwdriver on a tool changer.

In turrets with several tool spindles, these are usually all driven by a centrally arranged drive shaft having a central gear in the form of a bevel gear which meshes with bevel gears attached to the tool spindles. Such central, simultaneous drive of all tool spindles does, however, have a number of disadvantages: The service life of the spindle bearings is unnecessarily shortened. The tool spindles which are also rotating but not performing work cause unnecessary heating of the turret and reduce the efficiency. Also, in a turret with a large number of tool spindles, these can only be driven with relatively low torques.

Therefore, turrets with several tool spindles have been designed in which only one tool spindle at a time, i.e., the tool spindle that is in the working position at that particular time, is driven. Such a turret is disclosed in GB No. 2 126 134 A. In this known turret, a turret head which is rotatable about a central indexing axis relative to a stationary turret body can be moved away from the turret body in the direction of the indexing axis by a pressure medium cylinder. The turret head is then unlocked and can be rotated relative to the turret body, whereas it is prevented from rotation by engagement of a faced toothed coupling when it rests against the turret body. In order to monitor the angle of rotation of the turret head, it is connected to a shank which is concentric with the indexing axis and has a rotary encoder positioned on it. For each of the tool spindles rotatably mounted in the turret head, a shaft is mounted parallel to the indexing axis in the turret head. The shaft carries on its side facing away from the associated tool spindle a gear which will be referred to below as spindle gear. A drive shaft which extends parallel to the indexing axis and is displaceable in the longitudinal direction is mounted in radially spaced relation to the indexing axis in the turret body. At its end facing the turret head, the drive shaft carries a drive gear which by displacement of the drive shaft can be brought into engagement either with the spindle gear of the tool spindle in the working position or with a toothed ring of the turret head. Therefore, the drive shaft driven by a motor simultaneously constitutes a switchable coupling so that both the turret head can be rotated about the central indexing axis and the tool spindle that is in the working position at that particular time can be driven by one and the same motor.

However, this known turret also has a number of disadvantages: Firstly, the tool spindles that are not coupled with the motor at a particular time can be caused to rotate by the vibrations occurring during operation of a machine tool and hence lose their rotary angular position required for automatic tool change. During indexing of the turret head, this applies to all of the tool spindles since none of the tool spindles is coupled with the drive shaft while the turret head is being rotated. In addition, two hydraulic cylinders are required in this known turret, i.e., the above-mentioned one for displacement of the turret head and a second one for displacement of the drive shaft. The main disadvantage of the known turret is, however, that it is unsuitable for automatic tool change.

The object underlying the invention is to provide a turret with several tool spindles in which in view of the above-mentioned disadvantages not all of the tool spindles are driven simultaneously yet which is still suitable for fully automatic tool change.

Departing from a turret of the kind disclosed in GB No. 2 126 134 A, i.e., a turret comprising a turret body and a turret head rotatable about an indexing axis relative to the turret body, the turret head being displaceable along the indexing axis from a working position in which it is non-rotatably held on the turret body into an indexing position in which it is rotatable about the indexing axis, several tool spindles being rotatably mounted in the turret head, each of the tool spindles being in rotary drive connection with a spindle gear and being able to be brought into a working position by rotation of the turret head, further comprising a drive element rotatably mounted in the turret body and communicating with a rotary encoder for driving a switchable coupling for the indexing drive of the turret head and for driving a drive shaft rotatably mounted in radially spaced relation to the indexing axis in the turret body, and also comprising a drive gear engageable with the spindle g$\sim$ $\cdot$ a tool spindle in the working position, the obj$\epsilon$ is achieved, in accordance with the invention, by t$\sim$ spindle gear of a tool spindle which is in the working position being engageable with and disengageable from the drive gear of the drive shaft by displacement of the turret head between its indexing position and its working position, by a switchable locking mechanism being provided for each tool spindle, and by a releasing mechanism activatable by displacement of the turret head into its working position being provided on the turret body to release the locking mechanism of the tool spindle in the working position. As will be apparent from the foregoing, the spindle gears need not be attached directly to the tool spindles, and in the prior art, the axially displaceable drive shaft therein constitutes the switchable coupling. In the inventive turret, the drive element may be understood as any driven element preceding the drive shaft in the drive train.

In comparison with the known turret described above, the inventive turret has quite a number of advantages: A tool spindle which is in the correct rotary angular position for automatic tool change remains locked in this rotary angular position so long as it and the turret head are not in their working positions, i.e., a tool spindle which is not in the working position cannot be unintentionally rotated by indexing of the turret head or by vibrations occurring during operation of the machine tool, and a rotary encoder which is provided in any case for the indexing of the turret head may be used for rotary angular positioning of the tool spindles. Unlocking of the turret head from the turret body and disengagement of the work spindle in the working position from the drive shaft and also locking of the turret head on the turret body and engagement of the tool spindle in the working position with the drive shaft can be carried out with one and the same actuation, respectively, i.e., for example, with one single pressure medium cylinder since displacement of the turret head in the direction of the indexing axis causes simultaneous unlocking of the turret head from the turret body and release of the spindle gear of the tool spindle in the working position from the drive gear of the drive shaft. At the same time, all the advantages of the known turret described above are achieved, i.e., only one drive motor is required for indexing the turret head and driving the tool spindles; only the tool spindle in operation is driven so the individual tools can be driven at different specific rotational speeds without the maximum permissible rotational speed being restricted; and since the gearing comprising the drive shaft and the respective spindle gear can be arranged at a relatively large radial spacing from the central indexing axis, even in a turret with 12 tool stations, not only all of the tools can be driven, but also they can be driven with higher torques as the larger spacing permits larger gears. Since all of the tool spindles are also locked at the moment at which they are moved out of the working position, tool change can be carried out at a different point than in the working position of a tool and so, for example, a tool can be changed after it has been indexed by rotation of the turret head through 90 degrees.

It is known per se (German Auslegeschrift No. 2 044 187) for a driven tool of a turret to be engaged with and disengaged from a tool drive by the turret head being moved away from the turret body and simultaneously unlocked. In this known construction, however, firstly, a separate motor is provided merely for driving the tool and, secondly, the tool which is disengaged from the drive motor can rotate unintentionally since it is not locked.

Since the drive shaft serving to drive a tool spindle in the working position does not also have to assume the function of a coupling in the inventive turret, the drive shaft can, as is the case in a preferred embodiment of the inventive turret, be immovably mounted in the turret body.

As the inventive turret does not require a central drive shaft, and a motor serving to index the turret head and to drive the tool spindles can be arranged eccentrically in the turret body, the inventive construction makes it possible, without significant additional expenditure, for a second tool spindle to also be driven, more particularly, on the side of the turret opposite to the tool spindle which is in the working position at that particular time since only the shaft of the drive motor needs to be extended in order to create with it a second drive shaft for a second spindle. Accordingly, in a preferred embodiment of the inventive turret, a second drive shaft is arranged approximately opposite to the first drive shaft relative to the indexing axis. This is usually the motor shaft or an extension of the motor shaft which is in rotary drive connection with the first drive shaft and similarly carries a drive gear which when the turret head is in the working position meshes with the spindle gear of a tool spindle which is arranged approximately opposite to the tool spindle in the working position relative to the indexing axis. This second drivable tool spindle may also be a so-called synchronous spindle, i.e., a spindle which can be equipped with a workpiece clamping device. All that is then required is provision of a releasing mechanism on the turret body for this second drivable spindle in order to unlock this spindle when the turret head is locked on the turret body.

Particularly in the case where the drive is located at a point on the turret body approximately opposite to the drive shaft relative to the indexing axis, a construction is recommended in which a central gear which meshes with a gear of the drive shaft and is connectable to the turret head through the switchable coupling is rotatably mounted in the turret body concentrically with the indexing axis as such a central gear can readily be designed as ring wheel and so the center of the tool turret remains free for passage of hydraulic and coolant pipes and for transmission of measurement values relating to a workpiece and/or tool therethrough. If the turret has two drive shafts, it is then simplest for this central gear to be made to mesh with gears of both drive shafts.

In a construction with such a central gear, a shaft which is concentric with the indexing axis and fixedly connected to the turret head may extend through this central gear. This shaft is displaceable by means of a pressure medium-operated piston relative to the turret body, and it may also be of hollow construction in order to maintain passage of the above-mentioned pipes therethrough. Through this shaft, the turret head can then be indexed in a particularly simple way by one half of the coupling being connected to the central gear for rotation therewith and the other half of the coupling being connected to the shaft for rotation therewith.

In order that the tool spindle in the working position is automatically released, i.e., unlocked, when the turret head is locked on the turret body, but all other spindles (possibly with the exception of the further drivable spindles mentioned above) remain locked, and that this can be achieved in a simple mechanical way, the locking mechanisms of a particularly advantageous embodiment of the inventive turret each have a spring-loaded detent element which can engage in a notch on the associated spindle and also a release element for releasing the detent element, and a projection provided on the turret body is struck by the release element of a spindle in the working position when the turret head is moved from its indexing to its working position, whereby the tool spindle in the working position is unlocked. In this connection, it is to be noted that there already exists a known turret with drivable tool spindles (German Offenlegungsschrift No. 36 30 966) in which the turret body comprises at a point located opposite to a tool spindle in the working position a projection which upon displacement of the turret head from its indexing to its working position is struck by a spring-loaded pin which is axially displaceably guided in the turret head and serves to engage a coupling of the tool spindle in the working position. In this known turret, all of the tool spindles are provided with a coupling which connects two spindle halves, the inwardly located one of which has a bevel gear which constantly meshes with a bevel gear of a central drive shaft. Mere actuation of this coupling makes it possible in this known turret for only one tool spindle, i.e., the tool spindle in the working position, to be driven. Disadvantageous in this known construction is, however, not only the large number of switchable couplings which corresponds to the number of tool spindles, but also the fact that all of the inside halves of the tool spindles are constantly in rotary drive connection with the central drive shaft. Also, this construction requires the center of the turret for the drive shaft, and, finally, the tool spindles which are not driven at a particular time are not secured against unintentional rotation.

In the inventive turret, a single rotary encoder is adequate and, for space-saving reasons, it is simplest to place it on the drive shaft. Of course, it is also possible to provide a second rotary encoder for monitoring the indexing motions of the turret head although in the inventive turret this can be regarded as unnecessary expenditure.

Figure 2:
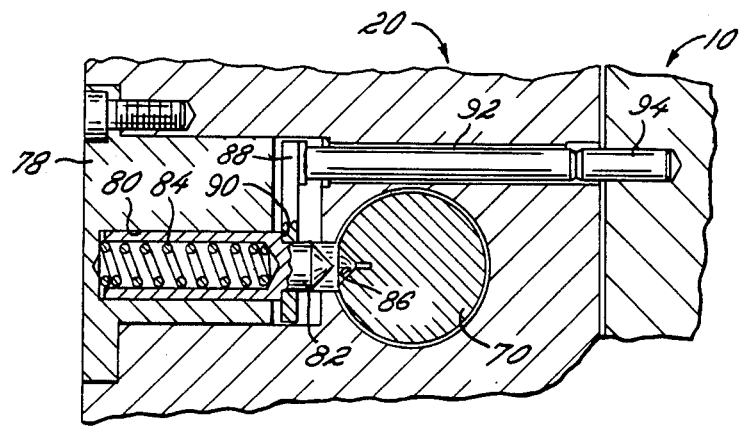
Figure 3:
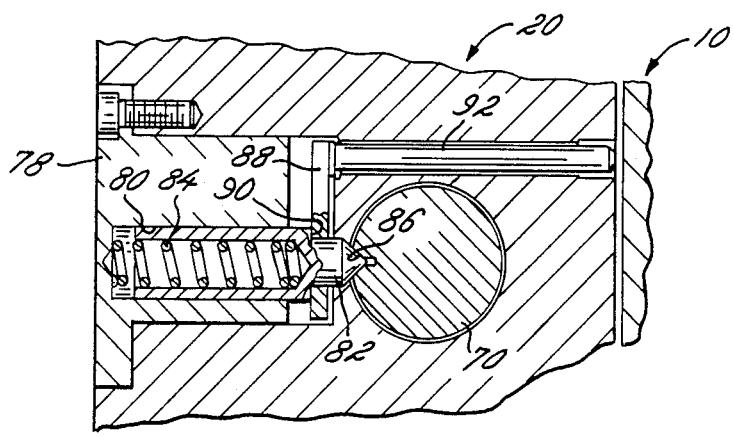
Figure 4:
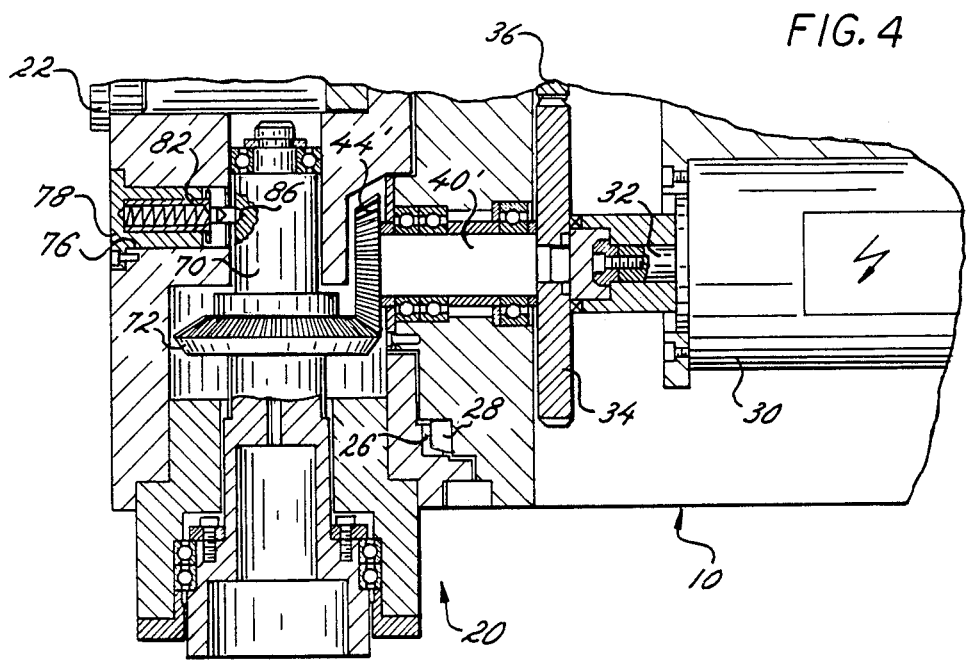
Figure 5:
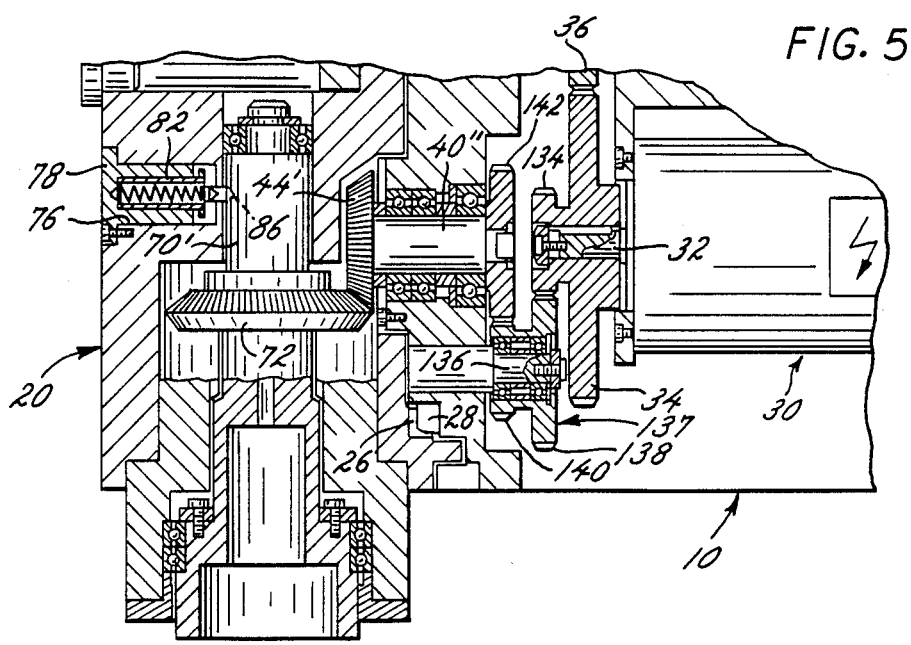

Further features, advantages and details of the invention are to be found in the appended claims and/or the following description and the accompanying drawings of three particularly advantageous embodiments of the inventive turret. The drawings show:

FIG. 1 an axial section through the first embodiment of the inventive turret, with the turret head in the working position;

FIG. 2 the locking and releasing mechanism in a section taken perpendicularly to the axis of the tool spindle in the working position, in the unlocked state;

FIG. 3 a section through the locking mechanism of a tool spindle which is not in the working position, again taken perpendicularly to the spindle axis;

FIG. 4 part of an axial section through the second embodiment of the inventive turret, illustrating the drive of a second spindle which may be a tool or a workpiece spindle and which is arranged diametrically opposite to a tool spindle in the working position; and FIG. 5 an illustration corresponding to FIG. 4 of the third embodiment in which the two spindles are driven at different rotational speeds.

FIG. 1 shows a casing-type turret body 10 in which a turret shaft 12 is mounted for rotation about a central indexing axis 14 in a manner not illustrated. This shaft comprises a longitudinal passage 16 for cables, coolant pipes and other pipes to be led therethrough. The longitudinal passage 16 opens into a cavity 18 of a turret head 20. A cover 22 is inserted into the cavity 18 in order to seal it. The turret head 20 is attached to the shaft 12 by means of screws 24. On its rear side, the turret head 20 has face toothing 26 which in the position of the turret head 20 shown in FIG. 1 meshes with face toothing 28 of the turret body 10, thereby preventing rotation of the turret head relative to the turret body. Therefore, the turret head 20 is shown in its working position in FIG. 1.

The turret body 10 houses a drive motor 30, the shaft 32 of which carries a gear 34. The gear 34 meshes constantly with a central gear 36 designed as a ring wheel. The central gear 36 is arranged coaxially with the indexing axis 14 and surrounds the turret shaft 12. By means of bearings 38, the central gear 36 is rotatably but axially immovably mounted in the turret body 10. At a point on the turret body 10 associated with the working position of driven tools carried by the turret, a drive shaft 40 is rotatably but axially immovably mounted in the turret body 10. Two gears are attached to the drive shaft 40. These are a gear 42 arranged inside the turret body 10 in constant engagement with the central gear 36 and having in the preferred embodiment the same number of teeth as the gear 34, and a drive gear 44 designed as a bevel gear arranged on the face of the turret body 10. A rotary encoder 46 is connected to the drive shaft 40 for rotation therewith. By means of this rotary encoder 46, the rotary angular positions of the drive shaft 40, and, as will be explained below, of the turret head 20 can be monitored and controlled.

Between a stop shoulder 48 formed on the turret shaft 12 and a nut 50 screwed onto the turret shaft 12, the following elements are axially immovably arranged on the turret shaft: A coupling ring 52 which is connected by means of a wedge 54 to the turret shaft 12 for rotation therewith; an axial bearing 56; and an annular piston 58 which surrounds the turret shaft. The annular piston 58 constitutes together with a cylinder chamber 60 formed in the turret body 10 a double-acting hydraulic cylinder and is guided in the turret body for displacement in the axial direction. For reasons of simplicity, the hydraulic oil ducts leading to the cylinder chamber 60 have been omitted in the drawings. By means of the annular piston 58, the turret shaft 12 together with the coupling ring 52 and the turret head 20 can be displaced in the axial direction, more particularly, from the working position of the turret head shown in FIG. 1 to the left into an indexing position of the turret head which is not shown. During this, the face toothing 26 on the turret head is lifted out of the face toothing 28 on the turret body, thereby enabling the turret head 20 to rotate in the indexing position about the indexing axis 14 relative to the turret body 10.

In accordance with the invention, the central gear 36 and the coupling ring 52 have coupling claws 62 and 64 on their ends which face each other. Therefore, the central gear 36 and the coupling ring 52 together form a coupling designated in its entirety 66 which engages when the annular piston 58 displaces the turret head 20 from its working position shown in FIG. 1 to the left into its indexing position, not shown, through the coupling ring 52 and the turret shaft 12, for the coupling claws 64 are then pushed in between the coupling claws 62. Since the face toothing 26 is thereby lifted out of the face toothing 28, i.e., the turret head is unlocked, in this state, the turret head can be rotated about the indexing axis 14 by means of the drive motor 30 and this rotary motion is monitored by the rotary encoder 46.

Several tool spindles 70 are rotatably mounted in the turret head 20. Exchangeable tool heads may be attached in the known way to the tool spindles. In the illustrated embodiment, a spindle gear 72 designed as a bevel gear is attached to each tool spindle. When the respective tool spindle is in the working position and the turret head 20 is locked on the turret body 10, the spindle gear 72 meshes with the drive gear 44 of the drive shaft 40—this is the case with the tool spindle 70 shown at the top in FIG. 1. However, when the turret head 20 is displaced to the left into its indexing position by means of the annular piston 58, not only is the turret head disengaged from the drive, but, at the same time, the spindle gear 72 of the tool spindle 70 in the working position is separated from the drive gear 44.

In the illustrated embodiment, the gears 44 and 72 form an angle gear unit. Alternatively, the tool spindles could be in axial alignment with each other and driven by means of a spur gearing.

The locking of all of the spindles which are not in the working position and the release of the spindles which are in the working position during locking of the turret head on the turret body will be explained below with reference to FIGS. 1 to 3.

For each spindle 70, a guide body 78 is inserted in a corresponding recess 76 in the turret head 20—cf. FIG. 1. By means of a guide bore 80, a detent pin 82 is displaceably guided in the guide body 78. The detent pin 82 is normally pressed by means of a compression spring 84 into a notch 86 on the circumference of the respective spindle 70 and thereby locks the spindle against unintentional rotation. A transmission plate 88 is placed on the detent pin 82 and rests against a shoulder 90 formed on the detent pin 82. A release pin 92 guided in a guide bore of the turret head 20 for displacement in the longitudinal direction is attached to the shoulder 90.

In accordance with the invention, a stop 94 attached to the turret body 10 is associated with the working position of the tool spindles. The stop 94 is located opposite the release pin 92 of a spindle 70 in the working position and the release pin 92 strikes the stop 94 when the turret head is moved from the left to the right, in accordance with FIG. 1, from its indexing position to its working position. The release pin 92 then presses the detent pin 82 out of its operative position shown at the bottom in FIG. 1 and also in FIG. 3 into its inoperative position shown at the top in FIG. 1 and also in FIG. 2, in which it releases the spindle 70 which is in the working position. Therefore, the spindle 70 can be driven by the drive motor 30 through the drive shaft 40, whereas all other spindles 70 which are not in the working position remain locked because there is no stop 94 associated with their positions on the turret body 10.

As shown in FIG. 4, without significant additional expenditure, a spindle 70' located, for example, diametrically opposite to the spindle 70 in the operating position can be driven by the same motor 30 as that with which the spindle 70 is driven in the working position and the turret head 20 is indexed. To do so, it is merely necessary to extend the motor shaft 32 or to connect a second drive shaft 40' to it and to provide the second drive shaft 40' with a second drive gear 44'. In addition, the turret body 10 must, of course, be provided with a stop 94 at this point adjacent to the spindle 70' in order to unlock the spindle 70'. As is also apparent from FIG. 4, the spindles 70 and 70', respectively, need not always be tool spindles. For example, one of the spindles such as spindle 70' may also be designed as a workpiece spindle in order to hold a workpiece to be machined on its rear side in a driven spindle of the turret.

As is clearly apparent from FIG. 1, in the inventive construction, the radial spacing of the drive shafts 40 and 40', respectively, from the indexing axis 14 may be chosen larger or smaller, which enables not only larger torques to be transmitted to the spindles 70 and 70', respectively, if required, but also a turret with a large number of stations, for example, a 12-station turret, to be provided with several drivable spindles as the gear elements driving the spindles can be arranged at a relatively large radial spacing from the indexing axis 14 and so the usual limitations with respect to the dimensions of the gear elements are eliminated to a large degree by the inventive construction.

It follows from the above description that each of the tool spindles may be replaced by a workpiece spindle. In that case, a locking mechanism may possibly be dispensed with for one or the other workpiece spindle.

As is apparent from the third embodiment shown in FIG. 5, the invention enables one and the same spindle to be driven at different rotational speeds at various stations of the turret without using a speed-change gear—in the embodiment shown in FIG. 4, the two spindles 70 and 70' are driven simultaneously, but also at the same rotational speed.

FIG. 5 shows only the area of the inventive turret between the motor 30 and the second driven spindle 70'. Therefore, the third embodiment shown in FIG. 5 will only be described insofar as it differs from the second embodiment shown in FIG. 4.

As shown in FIG. 5, a gear 34 is secured to the drive shaft 32 of the motor 30. In the context of the Claims, the drive shaft 32 constitutes the drive element. The gear 34 meshes with the central gear 36, but is firmly connected to a second gear 134 which serves to drive an intermediate shaft 137. The intermediate shaft 137 is rotatably mounted on a journal 136 attached to the turret body 10 and comprises a first gear 138 which meshes with the gear 134 and a second gear 140 which meshes with a gear 142 of a second drive shaft 40''. The number of teeth is so selected that, in accordance with the invention, gears 134 and 138 constitute a first reduction stage and gears 140 and 142 a second reduction stage. Consequently, spindle 70' is driven at a substantially lower rotational speed than the other spindle 70, not shown in FIG. 5, which is in the working position—cf. FIG. 1.

The embodiment shown in FIG. 5 has several advantages: A spindle in the indexed position of spindle 70' can be driven with a substantially higher torque than a spindle in the position of spindle 70—cf. FIG. 1. This is advantageous where the spindle 70' is used as workpiece spindle—for external machining of a workpiece, for example, with a turning tool, higher drive torques are required than for driven tools. If, however, a workpiece held by the main work spindle of a lathe is to be taken over by the spindle 70' for parting purposes, the spindle 70' is indexed into the position of spindle 70 shown in FIG. 1 so that it can be driven at the same high rotational speed as the main work spindle of the lathe and, consequently, a workpiece on which machining has been completed on its front face can be parted from bar-type stock which is also held at its free end. If the parted workpiece is to be further machined on its parted face, the workpiece spindle is then brought into the indexed position shown in FIG. 5 in which it can be driven at a lower rotational speed which is more suitable for external machining of the workpiece.

What is claimed is:

1. Turret comprising a turret body and a turret head rotatable about an indexing axis relative to said turret body, said turret head being displaceable along said indexing axis from a working position in which it is non-rotatably held on said turret body into an indexing position in which it is rotatable about said indexing axis, several spindles being rotatably mounted in said turret head, each of said spindles being in rotary drive connection with a spindle gear and being able to be brought into a working position by rotation of said turret head, further comprising a drive element rotatably mounted in said turret body and being in drive connection with a rotary encoder for driving a switchable coupling for indexing said turret head and for driving a drive shaft rotatably mounted in radially spaced relation to said indexing axis in said turret body, and also comprising a drive gear engageable with the spindle gear of a spindle which is in the working position, characterized in that said spindle gear of a spindle which is in the working position is engageable with and disengageable from said drive gear of said drive shaft by displacement of said turret head between its indexing position and its working position, in that a switchable locking mechanism is provided for each spindle, and in that a releasing mechanism activatable by displacement of said turret head into its working position is provided on said turret body to release said locking mechanism of said spindle in the working position.

2. Turret as defined in claim 1, characterized in that said drive shaft is immovably mounted in said turret body.

3. Turret as defined in claim 1, characterized in that said locking mechanisms are arranged in said turret head.

4. Turret as defined in claim 1, characterized in that a second drive shaft is provided in said turret body approximately opposite to said first drive shaft relative to said indexing axis, said second drive shaft being in rotary drive connection with said first drive shaft and likewise carrying a drive gear which meshes with said spindle gear of a tool or workpiece spindle when said turret head is in the working position, said tool or workpiece spindle being arranged approximately opposite to said spindle in the working position relative to said indexing axis.

5. Turret as defined in claim 1, characterized in that a central gear concentric with said indexing axis is rotatably mounted in said turret body, said central gear meshing with a gear of said drive shaft and being connectable to said turret head through said switchable coupling.

6. Turret as defined in claim 4 further comprising a central gear concentric with said indexing axis and rotatably mounted in said turret body, said central gear meshing with gears of both said drive shaft and said second drive shaft and being connectable to said turret head through said switchable coupling.

7. Turret as defined in claim 5, characterized in that said turret head is fixedly connected to a shaft concentric with said indexing axis, said shaft extending through said central gear and being displaceable relative to said turret body by means of a pressure medium-actuated piston.

8. Turret as defined in claim 7, characterized in that said piston is designed as an annular piston surrounding said shaft and is arranged in a cylinder chamber designed as an annular chamber in said turret body.

9. Turret as defined in claim 7, characterized in that one half of said coupling is connected to said central gear for rotation therewith and the other half is connected to said shaft for rotation therewith.

10. Turret as defined in claim 1, characterized in that said locking mechanisms each comprise a spring-loaded detent element engageable in a recess of the associated spindle and also a release element for releasing said detent element, and in that a projection is provided on said turret body, said release element of a spindle in the working position striking said projection when said turret head is moved from its indexing to its working position, whereby said spindle in the working position is unlocked by said release element.

11. Turret as defined in claim 1, characterized in that said spindle gear of said spindle in the working position is secured to said spindle and forms with said drive gear of said drive shaft an angle gear unit comprised of bevel gears.

12. Turret as defined in claim 1, characterized in that said rotary encoder is positioned on said drive shaft.

13. Turret as defined in claim 4, characterized in that two gear trains with different transmission ratios are provided between said drive element and said two drive shafts so that said two drive shafts are simultaneously drivable at different rotational speeds by said drive element.

14. Turret as defined in claim 13 further comprising a central gear concentric with said indexing axis and rotatably mounted in said turret body, said central gear meshing with a gear of said drive shaft and being connectable to said turret head through said switchable coupling, said drive element being in drive connection through gears with said central gear and an intermediate shaft, said intermediate shaft comprising a gear which meshes with a gear of said second drive shaft.

15. Turret as defined in claim 2 wherein said locking mechanisms are arranged in said turret head.

* * * * *